(12) United States Patent
Proeschel

(10) Patent No.: US 8,858,223 B1
(45) Date of Patent: Oct. 14, 2014

(54) GLYCERIN FUELED AFTERBURNING ENGINE

(75) Inventor: Richard Alan Proeschel, Medina, OH (US)

(73) Assignee: Proe Power Systems, LLC, Medina, OH (US)

( * ) Notice: Subject to any disclaimer, the term of this patent is extended or adjusted under 35 U.S.C. 154(b) by 1051 days.

(21) Appl. No.: 12/924,109

(22) Filed: Sep. 21, 2010

Related U.S. Application Data

(60) Provisional application No. 61/244,546, filed on Sep. 22, 2009.

(51) Int. Cl.
| | | |
|---|---|---|
| *F23D 11/44* | (2006.01) | |
| *F23K 5/22* | (2006.01) | |
| *F02C 9/40* | (2006.01) | |
| *F02C 7/224* | (2006.01) | |
| *F02M 53/02* | (2006.01) | |
| *F02M 31/18* | (2006.01) | |

(52) U.S. Cl.
USPC ............ 431/12; 431/11; 431/36; 431/37; 431/212; 60/736; 60/39.461; 60/39.464

(58) Field of Classification Search
CPC ........... F02C 7/224; F02C 9/40; F02M 31/18; F02M 53/02; F23C 2700/02; F23C 2700/023; F23C 2700/026; F23C 2900/99009
USPC ......... 431/11, 12, 36, 37, 103, 161, 239, 212, 431/207, 210; 60/39.461, 39.464, 736, 761, 60/764
IPC ... F02C 9/40, 7/224; F02M 53/02, 31/18; F23D 11/44; F23K 11/44
See application file for complete search history.

(56) References Cited

U.S. PATENT DOCUMENTS

| | | | | | |
|---|---|---|---|---|---|
| 158,315 | A | * | 12/1874 | Robinson | 431/161 |
| 391,018 | A | * | 10/1888 | Budd | 431/212 |
| 397,745 | A | * | 2/1889 | Neilson et al. | 431/239 |

(Continued)

FOREIGN PATENT DOCUMENTS

| | | | | |
|---|---|---|---|---|
| DE | 19606560 A1 | * | 9/1997 | F23D 11/44 |
| EP | 42454 A1 | * | 12/1981 | F23K 5/00 |

(Continued)

OTHER PUBLICATIONS

"WO_2006086814 MTrans.pdf", Machine Translation—WO #2006086814, EPO, May 30, 2012.*

*Primary Examiner* — Kang Hu
*Assistant Examiner* — Daniel E Namay

(57) ABSTRACT

A Glycerin Fueled Afterburning Engine utilizes the power generation unit exhaust heat to pre-heat the glycerin, or similar difficult to combust fuel, and then utilizes regenerative burner heating to fully vaporize and superheat the fuel above the auto ignition temperature. The combustion inlet air is also highly preheated by the recuperative power generation cycle. The actual combustion process is then accomplished by hypergolic ignition from mixing the hot vapor with the hot air. The overall engine process operates on a cycle of (1) air compression, (2) indirect heating of air in an air heater, (3) air expansion, (4) air heating by combustion, and (5) air cooling by heat transfer to the incoming compressed air charge in the recuperator. This invention comprises (1) air heater modifications for glycerin preheating, (2) combustor modifications for glycerin vaporization, (3) staged combustion for complete combustion and flame temperature control and (4) means for starting the process before it is able to become regenerative.

8 Claims, 4 Drawing Sheets

(56) References Cited

U.S. PATENT DOCUMENTS

| | | | | |
|---|---|---|---|---|
| 457,801 | A * | 8/1891 | Sturtevant et al. | 431/239 |
| 1,500,376 | A * | 7/1924 | Delaney | 431/4 |
| 1,672,997 | A * | 6/1928 | Benjamin | 431/37 |
| 2,225,310 | A * | 12/1940 | Lindhagen et al. | 60/773 |
| 2,298,663 | A * | 10/1942 | Traupel | 60/39.17 |
| 2,359,108 | A * | 9/1944 | Hoskins | 60/39.58 |
| 2,483,045 | A * | 9/1949 | Harby | 60/267 |
| 2,648,950 | A * | 8/1953 | Miller | 60/39.464 |
| 2,655,788 | A * | 10/1953 | Sedille | 60/39.461 |
| 2,677,236 | A * | 5/1954 | Grinsted | 60/775 |
| 2,692,477 | A * | 10/1954 | Toogood | 60/39.461 |
| 2,735,265 | A * | 2/1956 | Eastman | 60/775 |
| 2,949,010 | A * | 8/1960 | Cederquist | 60/775 |
| 2,958,189 | A * | 11/1960 | Britton et al. | 60/776 |
| 3,002,347 | A * | 10/1961 | Sprague | 60/39.12 |
| 3,057,153 | A * | 10/1962 | Rocchini et al. | 60/761 |
| 3,078,663 | A * | 2/1963 | Rocchini et al. | 60/761 |
| 3,078,665 | A * | 2/1963 | Trautman et al. | 60/761 |
| 3,115,852 | A * | 12/1963 | Robertson | 431/161 |
| 3,134,228 | A * | 5/1964 | Wolansky et al. | 60/39.55 |
| 3,203,175 | A * | 8/1965 | Ladislav et al. | 60/781 |
| 3,440,821 | A * | 4/1969 | Waltz | 60/259 |
| 3,656,872 | A * | 4/1972 | Jubb | 417/364 |
| 3,718,424 | A * | 2/1973 | Konagai | 431/207 |
| 3,768,958 | A * | 10/1973 | Sakai et al. | 431/208 |
| 3,895,488 | A * | 7/1975 | Koch | 60/39.461 |
| 3,978,657 | A * | 9/1976 | Fulton et al. | 60/39.12 |
| 4,086,758 | A * | 5/1978 | Harboe | 60/780 |
| 4,140,473 | A * | 2/1979 | Hoehing et al. | 431/11 |
| 4,188,782 | A | 2/1980 | Smith | |
| 4,238,925 | A * | 12/1980 | Lowther | 60/39.461 |
| 4,242,863 | A | 1/1981 | Bailey | |
| 4,289,475 | A * | 9/1981 | Wall et al. | 431/11 |
| 4,302,177 | A * | 11/1981 | Fankhanel et al. | 431/11 |
| 4,380,147 | A * | 4/1983 | Zaba | 60/39.182 |
| 4,392,809 | A * | 7/1983 | Tieberg et al. | 431/11 |
| 4,397,633 | A * | 8/1983 | Rowlee | 431/215 |
| 4,462,206 | A * | 7/1984 | Aguet | 60/39.182 |
| 4,532,982 | A * | 8/1985 | Nakamura | 60/39.461 |
| 4,838,029 | A | 6/1989 | Gleason | |
| 5,022,851 | A * | 6/1991 | Reiser et al. | 431/215 |
| 5,057,010 | A * | 10/1991 | Tsai | 432/179 |
| 5,080,579 | A * | 1/1992 | Specht | 431/207 |
| 5,121,600 | A * | 6/1992 | Sanders et al. | 60/39.464 |
| 5,149,260 | A * | 9/1992 | Foust | 431/11 |
| 5,161,365 | A * | 11/1992 | Wright | 60/780 |
| 5,617,716 | A | 4/1997 | Schreiber et al. | |
| 5,657,624 | A * | 8/1997 | Kang et al. | 60/783 |
| 5,816,790 | A * | 10/1998 | Ichinose et al. | 431/4 |
| 5,894,729 | A * | 4/1999 | Proeschel | 60/508 |
| 5,938,427 | A * | 8/1999 | Suzuki et al. | 431/208 |
| 5,944,504 | A * | 8/1999 | Tanaka et al. | 431/11 |
| 6,116,016 | A * | 9/2000 | Wada et al. | 60/39.17 |
| 6,123,540 | A * | 9/2000 | Ogata et al. | 431/2 |
| 6,210,150 | B1 * | 4/2001 | Rosen et al. | 431/4 |
| 6,233,916 | B1 * | 5/2001 | Anand et al. | 60/784 |
| 6,350,116 | B1 * | 2/2002 | Herrmann | 431/208 |
| 6,663,381 | B2 * | 12/2003 | Manohar | 431/10 |
| 6,702,570 | B2 * | 3/2004 | Shah et al. | 431/11 |
| 6,863,523 | B2 * | 3/2005 | Giella | 431/11 |
| 6,866,091 | B2 | 3/2005 | Autenrieth | |
| 6,932,594 | B2 * | 8/2005 | Weclas et al. | 431/7 |
| 7,028,476 | B2 | 4/2006 | Proeschel | |
| 7,476,098 | B2 * | 1/2009 | Iio | 431/6 |
| 7,500,347 | B2 | 3/2009 | Sanders et al. | |
| 7,624,576 | B2 | 12/2009 | Alkabie et al. | |
| 7,658,078 | B2 * | 2/2010 | Nishida et al. | 60/780 |
| 7,950,919 | B2 * | 5/2011 | Johnson et al. | 431/12 |
| 8,196,388 | B2 * | 6/2012 | Park et al. | 60/282 |
| 8,360,770 | B2 * | 1/2013 | Canacik et al. | 431/207 |
| 8,382,470 | B2 * | 2/2013 | Kinnunen | 431/7 |
| 8,496,472 | B2 * | 7/2013 | Roberts et al. | 431/9 |
| 2003/0054305 | A1 * | 3/2003 | Manohar | 431/10 |
| 2004/0002029 | A1 * | 1/2004 | Giella | 431/11 |
| 2004/0002030 | A1 * | 1/2004 | Shah et al. | 431/12 |
| 2005/0053878 | A1 * | 3/2005 | Bruun et al. | 431/11 |
| 2005/0257523 | A1 * | 11/2005 | Proeschel | 60/651 |
| 2006/0105278 | A1 * | 5/2006 | Katayama | 431/11 |
| 2006/0210936 | A1 * | 9/2006 | Veenstra | 431/11 |
| 2007/0125091 | A1 * | 6/2007 | Roby et al. | 60/776 |
| 2008/0110083 | A1 | 5/2008 | Baehr et al. | |
| 2008/0115502 | A1 * | 5/2008 | Roby et al. | 60/783 |
| 2008/0145805 | A1 * | 6/2008 | Towler et al. | 431/12 |
| 2008/0182213 | A1 * | 7/2008 | Masin | 431/11 |
| 2008/0305445 | A1 | 12/2008 | Roberts et al. | |
| 2009/0120338 | A1 * | 5/2009 | Adendorff et al. | 110/345 |
| 2009/0202953 | A1 | 8/2009 | Masin | |

FOREIGN PATENT DOCUMENTS

| | | | | |
|---|---|---|---|---|
| GB | 2096761 A | * | 10/1982 | F23D 11/22 |
| JP | 52034148 A | * | 3/1977 | F02C 7/04 |
| JP | 54141426 A | * | 11/1979 | F23D 11/44 |
| JP | 55014413 A | * | 1/1980 | F23D 11/44 |
| JP | 08291719 A | * | 11/1996 | F02C 7/22 |
| JP | 2002115812 A | * | 4/2002 | F23D 11/16 |
| WO | WO 9811386 A1 | * | 3/1998 | F23K 5/20 |
| WO | WO 2006086814 A2 | * | 8/2006 | |

* cited by examiner

GLYCERIN FUELED AFTERBURNING ENGINE

RELATED APPLICATION

This application claims the benefit of provisional patent application U.S. 61/244,546 filed 22 Sep. 2009 by the present inventor.

BACKGROUND OF THE INVENTION

1. Field of the Invention

This application relates generally to engines and power generation systems that use high viscosity, high auto ignition temperature liquid fuels for generating power and heat. More particularly, it relates to an open cycle air engine where regenerative heating is used to preheat and vaporize glycerin, and where the combustion inlet air is also preheated by the afterburning power generation cycle, so that it the glycerin fuel may be cleanly and completely combusted to provide heat energy to operate the engine.

2. Description of Prior Art

Glycerin, $C_3H_5(OH)_3$, is also known by other names including glycerol; glycerine; and 1,2,3-Propanetriol. It is widely used in industry for applications such as paints, antifreeze, pharmaceuticals, and cosmetics. Typically, glycerin has been manufactured as a byproduct of soap or from processing propylene. However, recently, very large quantities of glycerin have become available as a byproduct of the production of biodiesel fuel. The biodiesel production process generates a gallon of glycerin for approximately every 10 gallons of biodiesel. As biodiesel production has grown, the glycerin market has become saturated. Instead of receiving the anticipated revenue from selling the glycerin byproduct to chemical companies, biodiesel manufacturers are now having to pay for disposal of what has become an unwanted waste product.

Ideally, the waste glycerin could be combusted to produce heat for the biodiesel production process, making it a self fueling process; much like 19th century whaling ships burned waste portions of whales as they rendered blubber for oil. Unfortunately, glycerin is very difficult to burn for three reasons: First, it has a high viscosity and that makes it difficult to inject into a combustion process. Second, it has a high auto ignition temperature (393 C. or 739 F.) that makes ignition difficult to initiate and sustain. Finally, it begins to decompose to form toxic acrolein at temperatures above 150 C. or 302 F. For these reasons, the biodiesel industry does not currently use glycerin to fuel its process.

The following table illustrates the key property differences between gasoline and glycerin that make glycerin combustion difficult. Glycerin's viscosity is orders

| Comparison of Key Combustion Properties | | |
|---|---|---|
| | Gasoline | Glycerin |
| Viscosity @ 20 C. (c.p.) | 0.6 | 1499 |
| Normal Boiling Point (° C.) | ~126 | 290 |
| Auto-Ignition Temp (° C.) | 280 | 393 |
| Heat of Vaporization (cal/g) | 75 | 229 |
| Heat of Combustion (cal/g) | 11500 | 4144 | of magnitude larger than gasoline, making it much more difficult to effectively force through injectors and nozzles. Glycerin requires significantly higher temperatures and energies to vaporize and auto ignite while releasing much lower specific energy from the combustion process.

The difficulties of glycerin combustion have similarly made it unsuitable for an engine fuel. It cannot be burned in an internal combustion engine and has previously been impractical for fueling turbine engines.

Nevertheless, the prior-art contains several means for combusting glycerin and similar high viscosity, high auto ignition temperature fuels.

U.S. Pat. No. 4,188,782 ("Fuel Vaporizing Combustor Tube", Smith et al., 1980) and U.S. Pat. No. 4,242,863 ("Dual Fuel Vaporizing Combustor", Baily, 1981) teach methods for combusting high viscosity fuels by vaporizing, or partially vaporizing, the fuel with preheated air and then impinging the fuel/air mix onto a hot surface plate located in the combustion zone.

U.S. Pat. No. 4,838,029 (Externally Vaporizing System for Turbine Combustor", Gleason, deceased et al., 1989) teaches a gas turbine combustor where compressor bleed air is mixed with fuel in an auxiliary burner to generate "very hot, nearly-inert gases for vaporizing the main fuel supply" and then injecting the combined hot gases and vaporized fuel into the combustion chamber where it mixes with additional air to complete the combustion.

A promising prior-art is contained in US 2008/0305445 A1 ("Process for Combustion of High Viscosity Low Heating Value Liquid Fuels", Roberts et al. 2008). Roberts teaches preheating the glycerin to reduce its viscosity and then atomizing it with high pressure (190 psig) air.

The prior-art methods for combusting glycerin typically are based on a process of preheating the liquid fuel to reduce viscosity and then mixing the preheated fuel with air or combustion products to further atomize or vaporize the fuel for complete combustion. All these methods require fairly complex and expensive burners. In addition, Gleason's and Roberts' methods require a source of high pressure air.

A much simpler means of combusting glycerin and similar fuels is possible for the specific case where the fuel is intended for use in an Indirectly Fired Gas Turbine (IFGT) or Afterburning, Recuperated, Positive Displacement (ARPD) engine (U.S. Pat. No. 7,028,476B2 "Afterburning, Recuperated, Positive Displacement Engine", Proeschel, 2006).

Both the IFGT and ARPD engines operate as shown in FIG. 1. Both are air cycle engines utilizing the steps of air compression, indirect heating of the compressed air, expansion of the hot air to produce power, exhausting of the expanded air into a burner to support combustion, and finally using the combustion products to provide heat to the compressed air. Both the IFGT and ARPD can be considered "afterburning engines" because the combustion process takes place after the air has done mechanical work in the engine. In an IFGT the "Compressor" and "Expander" shown in FIG. 1 are turbomachines. In an ARPD the "Compressor" and "Expander" shown in FIG. 1 are positive displacement machines.

The primary aim of the glycerin combustion process for afterburner fired powerplants is to overcome the disadvantages of the prior art by using the unique configuration of the IFGT and ARPD family of engines to provide an integrated system to completely and cleanly combust glycerin or similar fuels to achieve an economical and efficient means of producing electric and/or mechanical power.

OBJECTS OF THE INVENTION

It is an object that the Glycerin Combustion Process for Afterburner Fired Powerplants utilize the waste heat in the exhaust of an IFGT or ARPD power generation unit, to the maximum extent possible, to preheat glycerin or a similar fuel to lower its viscosity while also recovering exhaust heat to increase the enthalpy of the liquid fuel.

It is a further object that the glycerin or similar fuel utilize regenerative heating so it is completely vaporized and superheated above the auto ignition temperature of the fuel air mix prior to entering the burner.

It is also an object that, under steady state operation, the air entering the burner also be above the auto ignition temperature of the fuel air mix.

It is, therefore, a primary object that fuel and air enter the burner in high temperature vapor and gaseous states respectively so that they auto ignite hypergolicly when mixed.

It is a key object that the resulting combustion take place completely, cleanly, efficiently, and safely.

It is an object that the process be capable of automatic control.

It is also an object that the powerplant be applicable to both indirectly fired gas turbine (IFGT) and Afterburning, Recuperated, Positive Displacement (ARPD) power generation units.

It is another object that the process be simple, allow easy maintenance, and be capable of being performed with low cost components.

SUMMARY OF THE INVENTION

A Glycerin Combustion Process for Afterburner Fired Powerplants has been devised to implement the stated objects of the invention. The process takes advantage of the ease in which fuel can be regeneratively heated in afterburner fired IFGT and ARPD powerplants. In these powerplants, hot combustion gases exit the burner at a temperature of approximately 815 C. or 1500 F. The hot gases then pass through an air heater (a counterflow heat exchanger) where heat is transferred to the compressed air in the engine cycle. After the combustion gases leave the air heater they are still at a temperature of about 227 C. or 440 F.

The glycerin combustion process causes glycerin to pass through a liquid to gas heat exchanger downstream of the air heater so that the glycerin is heated to a temperature approaching the 227 C. exhaust temperature. That part of the process allows otherwise waste heat to be used to preheat the glycerin, significantly reducing its viscosity. The glycerin then flows through a vaporizer that is located downstream of the flame in the burner. The vaporizer heats the glycerin to the 290 C./554 F. vaporization temperature and then continues to heat it until it is fully vaporized and slightly above the auto ignition temperature of 393 C./740 F. The hot glycerin vapor is then injected into the burner where it mixes with hot air from the engine and is auto ignited.

BRIEF DESCRIPTION OF THE DRAWINGS

A better understanding of the invention may be gained by reference to the following Detailed Description in conjunction with the drawings provided in which.

REFERENCE NUMBERS IN FIG. 2 THROUGH FIG. 4

Prior Art Components
1 Power Generation Unit
1A Compressor
1B Expander
1C Alternator or Power Takeoff
1D Expander Exhaust Tube
2 Air Heater
2A High Pressure Cold Air Inlet Tube
2B High Pressure Hot Air Outlet Tube
2C Low Pressure Hot Combustion Product Inlet Tube
2D Exhaust Tube
Novel Modifications
3 Burner
3A Flame Holder
3B Nozzle
3C Fuel Gas Inlet Tube
4 Fuel Storage and Control Assembly
4A Fuel Supply Tank
4B Fuel Pump Inlet Tube
4C Fuel Pump
4D Fuel Pump Outlet Tube
4E Fuel Control Valve
4F Fuel Bypass Line
4G Fuel Pressure Regulator
5 Fuel Heater Circuit
5A Pre-Heater Inlet Tube
5B Pre-Heater
5C Pre-Heater Outlet Tube
5D Vaporizer
5E Vaporizer Outlet Tube
6 Start System
6A Start Fuel Supply
6B Start Blower
6C Start Valve
6D Ignitor

DETAILED DESCRIPTION OF THE PREFERRED EMBODIMENTS

Figure 1:
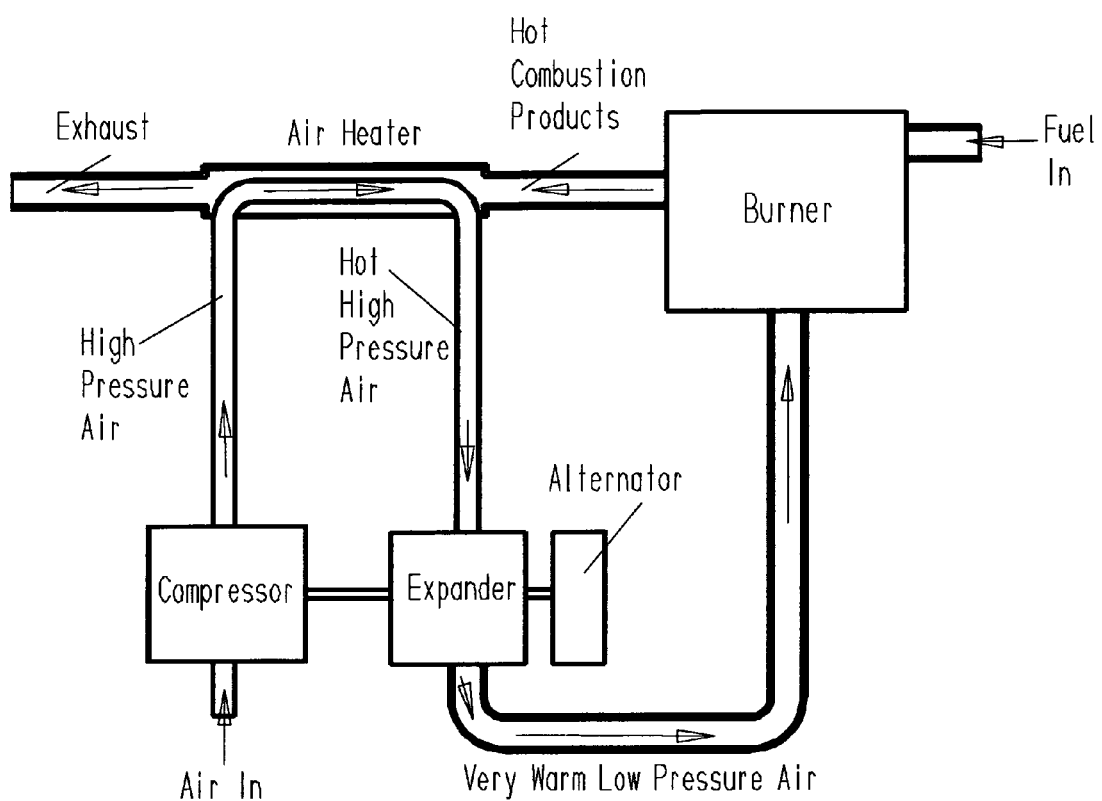
FIG. 1 is a prior art afterburner fired powerplant diagram. (Described in the BACKGROUND OF THE INVENTION section).
Figure 2:
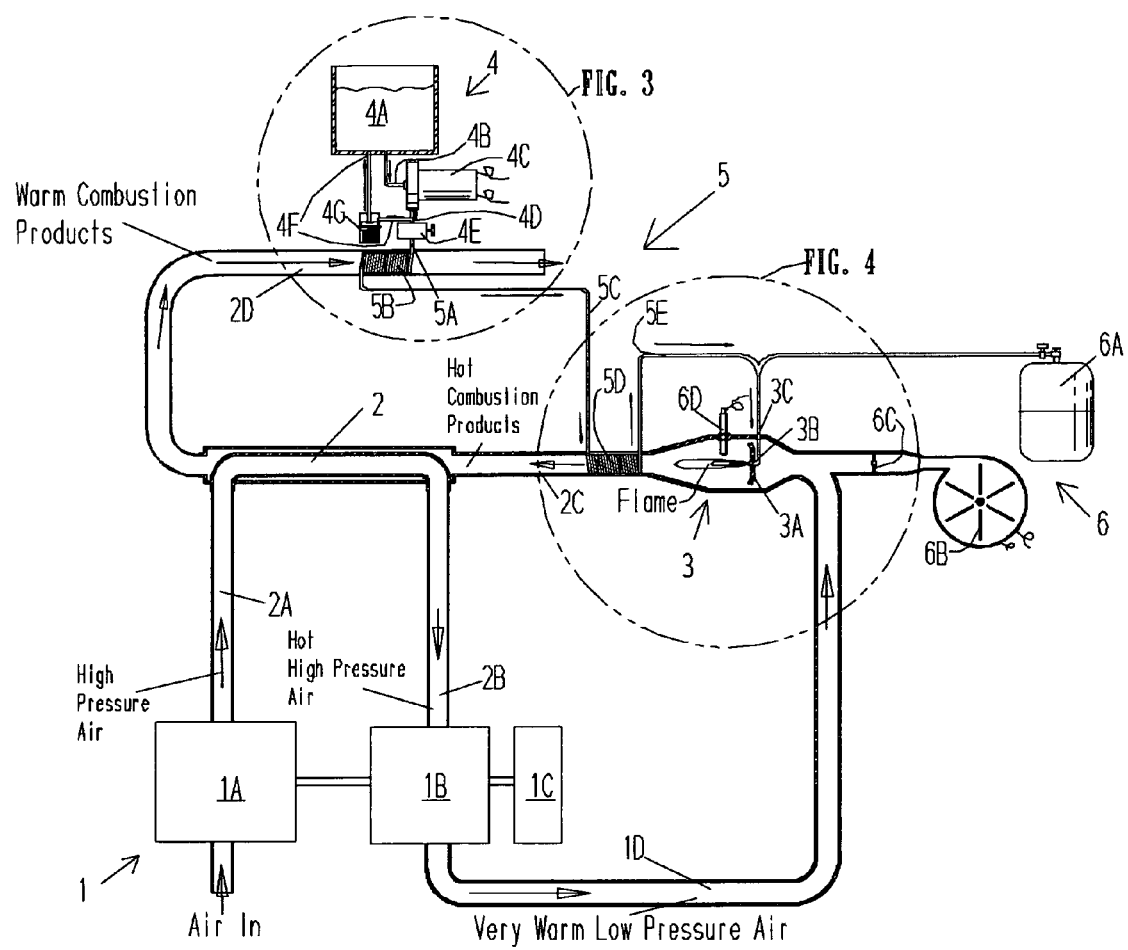
FIG. 2 is a diagram of an afterburner fired powerplant incorporating the novel features utilized in a glycerin combustion process for afterburner fired powerplants.

FIG. 2 shows the primary components comprising a typical afterburner fired powerplant utilizing the glycerin combustion process. The major components are the Power Generation Unit 1, the Air Heater 2, the Burner 3, the Fuel Storage and Control Assembly 4, the Fuel Heater Circuit 5, and the Start System 6. The Power Generation Unit 1 and the Air Heater 2 remain unchanged from usual practice. However the Burner 3, the Fuel Storage and Control Assembly 4, the Fuel Heater Circuit 5, and the Start System 6 are novel changes from the prior art. The function of each component in the glycerin combustion process can best be understood by tracing the fuel and air flows separately.

Air Flow Process

Air enters the Power Generation Unit 1 through the compressor 1A where it is compressed to approximately 4 atmospheres absolute pressure. The compressed air exits the compressor through the Air Heater High Pressure Cold Air Inlet Tube 2A and then passes into the Air Heater 2.

The compressed air travels through the flow passages inside the Air Heater 2, in counterflow to the hot combustion gases, and is heated to approximately 790 C./1470 F. The now hot compressed leaves the Air Heater through the High Pressure Hot Air Outlet Tube 2B.

The hot compressed air expands in the Expander 1B portion of the Power Generation Unit. The expansion process extracts power from the air and that power is used to drive the Compressor and also to provide useful electrical or mechanical power through an Alternator or Power Takeoff 1C.

After expansion, the air is at a pressure just slightly above atmospheric but still at a very warm temperature of approximately 490 C./900 F. The air leaves the Expander via the Expander Exhaust Tube 1D and flows into the Burner 3.

Because the air from the Power Generation Unit is above the auto ignition temperature of glycerin, 393 C./740 F., when it is used as blast air in the Burner, it allows glycerin, or similar fuel, to be cleanly and completely combusted without the concern for the fuel becoming cooled below the ignition point, and thus extinguishing combustion. After firing, the hot combustion products enter the Air Heater 2 through the Low Pressure Hot Combustion Product Inlet Tube 2C at a typical temperature of 815 C./1500 F. The combustion products transfer heat to the incoming high pressure air and, by doing so, are cooled to approximately 227 C./440 F. when they leave the Air Heater through the Exhaust Tube 2D.

Fuel Flow Process

The fuel flow process has the objective of converting ambient temperature liquid glycerin, or similar fuel, to a superheated vapor at a temperature above the fuel's auto ignition temperature.

Figure 3:
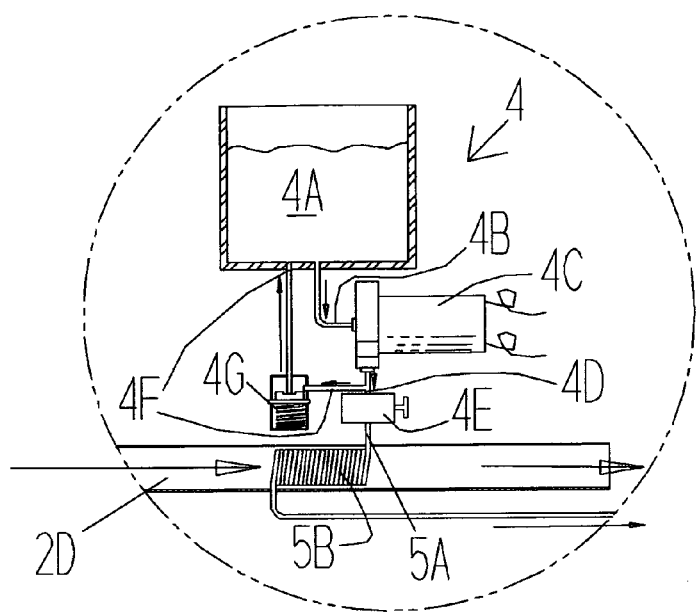
FIG. 3 shows an enlarged view of the fuel storage and control components and also the fuel pre-heater.

As shown in FIG. 2 and FIG. 3, liquid fuel is stored and controlled by the Fuel Storage and Control Assembly 4. The liquid fuel is stored in the Fuel Supply Tank 4A. A Fuel Pump 4C receives fuel through the Fuel Pump Inlet Tube 4B and raises the fuel pressure so that it can be injected into the air flow in the Burner 3. Because the Burner is at nearly atmospheric pressure, the Fuel Pump only needs to provide sufficient pressure to overcome flow loses and is a low pressure pump. From the Fuel Pump, the fuel passes through the Fuel Pump Outlet Tube 4D and either enters the Fuel Control Valve 4E or Fuel Bypass Line 4F. The Fuel Flow to the Burner is controlled by the Fuel Control Valve 4E. The Fuel Control Valve provides the means to modulate the flow of fuel to match engine demand. The Fuel Pressure Regulator 4G modulates the flow through the Fuel Bypass Line to maintain a near constant fuel pressure.

The metered fuel from the Fuel Control Valve enters the Fuel Heater Circuit 5 through the Pre-Heater Inlet Tube 5A. From there the fuel passes through the Fuel Pre-Heater 5B. The Fuel Pre-Heater is a liquid to gas heat exchanger that allows the otherwise wasted heat in the Exhaust Tube 2D to be recovered to pre-heat the fuel. This pre-heating part of the process greatly reduces the fuel viscosity and allows it to pass more easily through the rest of the Fuel Heater Circuit. However, the gas in the Exhaust Tube is not hot enough to obtain the objective of converting the fuel to a vapor at a temperature greater than the auto ignition temperature. Therefore, additional heating is required in a hotter location.

Figure 4:
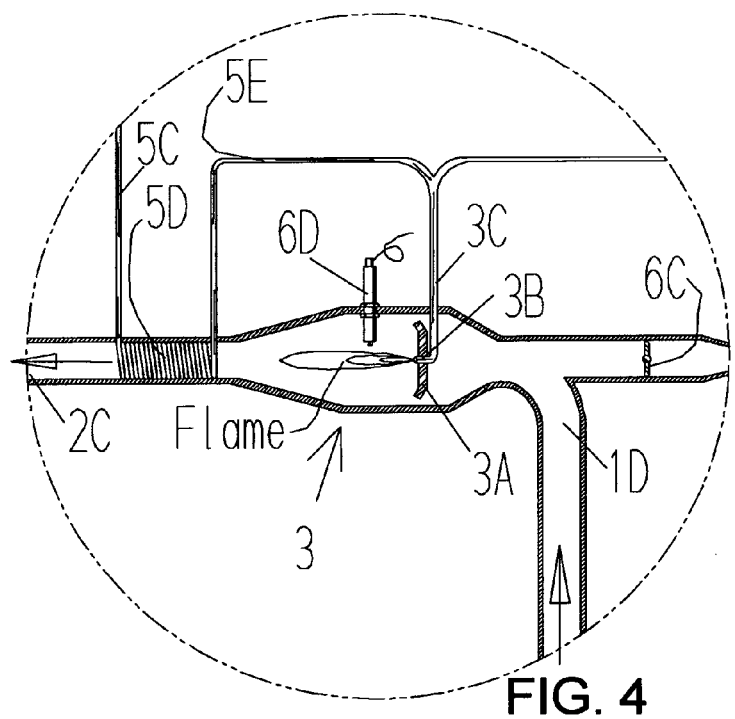
FIG. 4 is an enlarged view of the fuel vaporizing heater, the burner and ignitor.

The necessary additional heating is available after the fuel flows through the Pre-Heater Outlet Tube 5C to the Vaporizer 5D. As also shown in FIG. 4, the Vaporizer is located in the Air Heater Low Pressure Hot Combustion Inlet Tube 2C and is exposed to the full combustion temperature of 815 C./1500 F. The Vaporizer is essentially a flash boiler and super-heater that allows the fuel to be vaporized and heated to a temperature that allows it to auto ignite when mixed with the 490 C./1500 F. air in the Burner.

The hot vapor is conveyed to the Burner 3 through the Vaporizer Outlet Tube 5E and into the Fuel Gas Inlet Tube 3C. The preferred configuration of the Burner is shown. With this process the Burner is a gas fuel/air burner where the vaporized fuel is injected into the flame through a Nozzle 3B. The main air flow enters the Burner through the Expander Exhaust Tube 1D. The flame is shielded from the high air flow by a Flame Holder 3A. The Flame Holder allows the air to mix in eddy currents that anchor the flame and also limit the air flow to the flame zone to assure a proper air/fuel ratio in the flame. Afterburner fired IFGT and ARPD engines have a high overall air/fuel ratio. Therefore most of the air bypasses the flame zone. The near stoichiometric flame combustion gases mix with the main air flow downstream of the initial flame. In this manner, the combustion is staged so that initial combustion is slightly richer than stoichiometric and then additional air is added to completely combust the mixture, avoid excess NOx production, minimize unfavorable combustion products such as acrolein and aldehydes, and to achieve the design burner exit temperature of about 815 C./1500 F.

Figure 5:
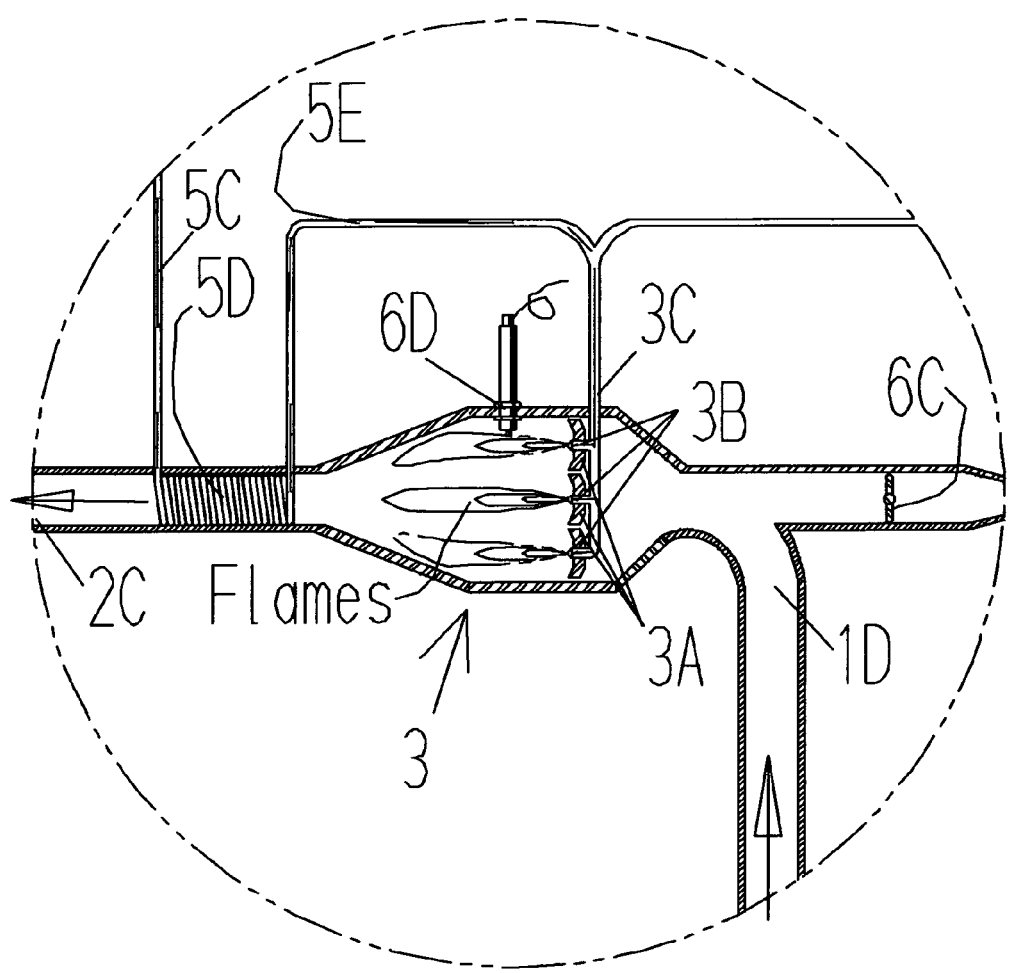
FIG. 5 is an enlarged view of the fuel vaporizing heater, the burner and the ignitor where the burner contains a plurality of nozzles and flame holders.

In an alternative to the preferred configuration of the burner, a plurality of burner nozzles and flame holders may be utilized to better optimize the combustion process (FIG. 5)

Operation

Under steady state conditions the Glycerin Combustion Process for Afterburner Fired Powerplants is completely regenerative. Both the combustion air and vaporized fuel are indirectly pre-heated by the heat from the flame prior to entering the Burner. Therefore, although the process is self sustaining once started, it cannot start by itself. Consequently, the Start System 6 shown in FIG. 2 and FIG. 4 is utilized to start the powerplant.

Fuel for starting is an easily combusted fuel such as propane or natural gas provided by a regulated Start Fuel Supply 6A. Air for starting is provided by a Start Blower 6B. The Burner is lit by opening the Start Valve 6C and turning on the Start Blower to begin air flow. Next, the Ignitor 6D, a sparking or glowing device, is started to provide an ignition source. Fuel is then provided by the Start Fuel Supply and the flame is initiated. The Ignitor can then be turned off. Once the Air Heater 2 reaches operating temperature, the powerplant is turned over by a start motor (not shown) or by motoring the Alternator or Power Takeoff 1C. The engine will then begin to run, although still fueled from the Start Fuel Supply. As the engine reaches operating speed, the Start Valve is closed and the Start Blower is turned off. Then, when the Pre-Heater 5B, and the Vaporizer 5D reach operating temperatures, the primary fuel is started through the Fuel Control Valve 4E, the Start Fuel Supply is stopped and the powerplant operates in steady state.

Powerplant control consists of matching the powerplant power output to the load demand while also maintaining the proper air/fuel mixtures.

Load matching control varies with the type of power generation unit. IFGT powerplants typically have limited capability for load following. Consequently IFGT's are normally operated at full design power. When the local demand is less than the power generation rate the excess power is stored in batteries, other storage devices, or by putting power on the grid. Afterburning, Recuperated, Positive Displacement (ARPD) engines can control the air flow through the power generation unit to provide a larger capability for load following. Powerplants using ARPD power generation units thus have more flexibility in load following.

With either type of power generation unit, air/fuel mixture control is accomplished by using the Fuel Control Valve 4E to match the air flow.

CONCLUSION, RAMIFICATIONS AND SCOPE

The Glycerin Combustion Process for Afterburner Fired Powerplants meets the objective of providing an extremely simple, reliable, efficient and safe method for obtaining mechanical and/or electrical power by regeneratively combusting otherwise difficult to burn fuels such as glycerin. Obviously, within the purview of the invention here disclosed, many hardware modifications and variations are possible. These include a wide variety of Air Heaters, Fuel Heaters, and Burners. It is also clear that there are numerous methods for implementing the process using a mix of new and existing components and parts. It is therefore understood that, within the scope of the appended claims and their legal equivalents, the invention may be practiced otherwise than as specifically described.

I claim:

1. An engine for producing mechanical power by utilizing high viscosity, high auto ignition temperature, liquid fuel; said engine using the heat from the combustion products of said fuel with air in a sequential counterflow process consisting of 1) converting said fuel to a superheated vapor, 2) providing indirect air heating to a power generation unit to both produce mechanical power and to raise the temperature of said air above said auto-ignition temperature of said fuel and 3) preheating said fuel; whereby said sequential process meets the objective of providing fuel and air to the combustion process at a hypergolic condition; said engine comprising:
 a. said power generation unit for producing mechanical power using an indirectly fired brayton cycle, said power generation unit comprising:
  i. a compressor for receiving ambient air and increasing the pressure of said air,
  ii. an air heater for indirectly heating said compressed air by heat exchange from hot combustion products,
  iii. an expander for producing said mechanical power by expanding said heated and compressed air to a lower pressure and temperature while still maintaining the temperature of said air above the auto ignition temperature of said fuel,
  iv. a means for conveying said mechanical power to at least one device selected from the group containing mechanical power take-offs and electrical generators, while also providing sufficient mechanical power to operate said compressor;
 b. a fuel system for utilizing said high viscosity, high auto ignition temperature, liquid fuel to generate a controlled flow of fuel vapor heated to a temperature above said auto ignition temperature, said fuel system comprising:
  i. a liquid fuel supply container,
  ii. a means for pressurizing said liquid fuel while also controlling both flowrate and pressure,
  iii. a fuel pre-heater for pre-heating said pressurized liquid fuel to reduce the viscosity of said pressurized liquid fuel by indirect heat exchange with said hot combustion products,
  iv. a fuel vaporizer for converting said pressurized, low viscosity, liquid fuel to a superheated fuel vapor at a temperature above said auto ignition temperature by indirect heat exchange with said hot combustion products;
 c. a burner for combining said air from said expander and said fuel vapor from said fuel vaporizer, both at a temperature above said auto ignition temperature, wherein said combined air and fuel vapor ignite hyperpergolicly to produce said hot combustion products; and
 d. a means for starting said engine comprised of:
  i. a means for combining ambient temperature air and an easily ignitable fuel and further igniting said combination of ambient temperature air and said easily ignitable fuel to form said hot combustion products to allow said air heater, fuel pre-heater, and fuel vaporizer to be brought to operating temperature before starting the flow of said high viscosity, high auto ignition temperature, liquid fuel,
  ii. a means for causing the power generation unit of said engine to begin rotating until continued rotation becomes self-sustaining;
whereby the prior-art difficulties of using said high viscosity, high auto ignition, temperature, liquid fuels are overcome to produce said mechanical power and whereby the mechanical portions of said power generation unit are not exposed to corrosive combustion products contained in said combustion products so that said mechanical portions will have a favorable operating environment.

2. The engine of claim 1 where said fuel pre-heater is located in the exhaust tube of said engine so that said preheating can be accomplished utilizing otherwise wasted exhaust heat contained in said hot combustion products and whereby peak fuel efficiency can be obtained.

3. The engine of claim 1 wherein said high viscosity, high auto ignition temperature, liquid fuel is glycerin.

4. The engine of claim 1 wherein said high viscosity, high auto ignition temperature, liquid fuel is a fuel oil.

5. The engine of claim 1 wherein the flow rate of said ambient air into said compressor is controlled while said controlled flow of fuel vapor is controlled in unison whereby the amount of said mechanical power is controlled to match the required load.

6. The engine of claim 5 wherein means for pressurizing said liquid fuel while also controlling both flowrate and pressure is accomplished by a process comprised of pressurizing said fuel with a fuel pump, metering said fuel with a flow control valve, and controlling the pressure of said fuel by a fuel pressure regulator.

7. The engine of claim 1 where said burner utilizes a nozzle to inject said vaporized fuel and wherein said nozzle is shielded from the main flow of said air by a flame holder so that said combustion occurs in a staged manner whereby initial combustion is slightly richer than stoichiometric and then additional air is added to completely combust said mixed fuel and air so as to avoid excess NOx production, minimize unfavorable combustion products such as acrolein and aldehydes, and to achieve a predetermined design burner exit temperature.

8. The burner of claim 7 wherein a plurality of said nozzles and flame holders are contained in said burner and whereby the combustion process can be made more optimum.

* * * * *